March 17, 1931. W. A. GLASCOCK 1,796,518
TWIN AUTOMATIC REPOURING COFFEE MACHINE
Filed Feb. 15, 1928 3 Sheets-Sheet 2
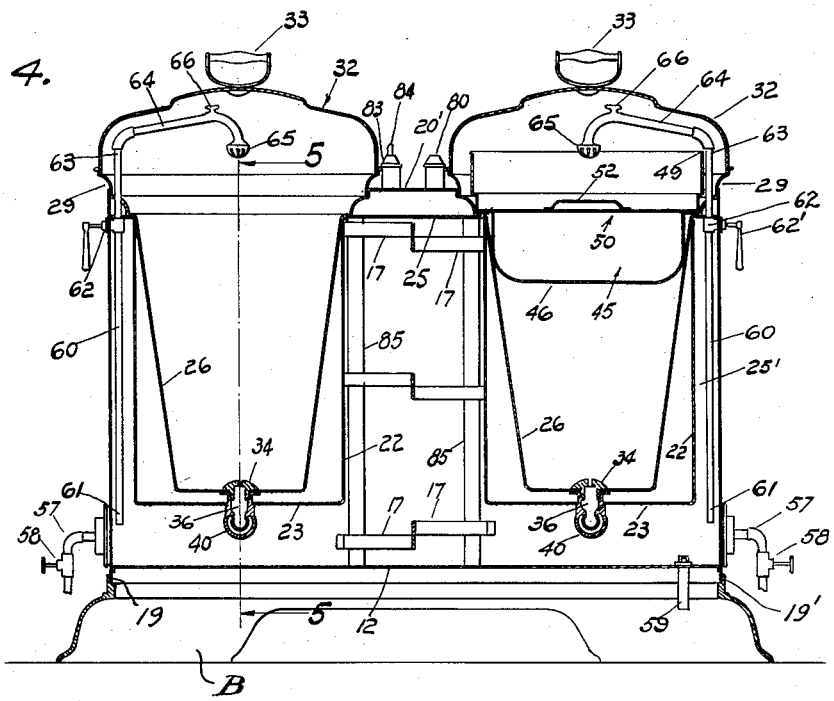
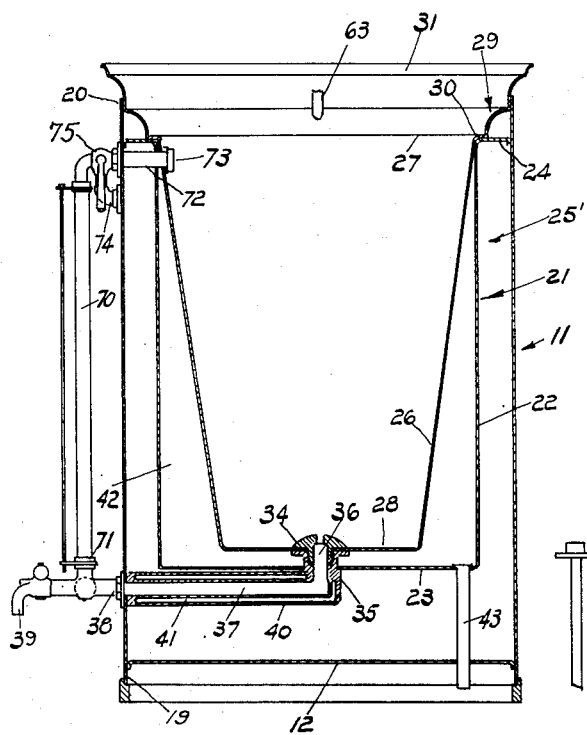
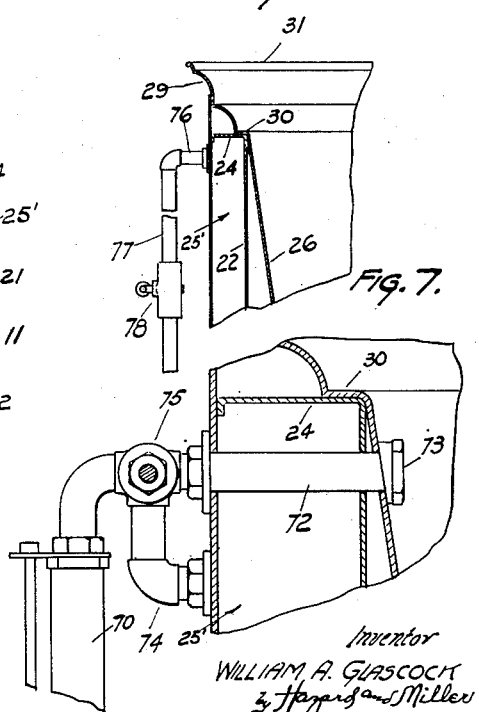
Inventor
WILLIAM A. GLASCOCK
by Hazard and Miller
Attorneys.

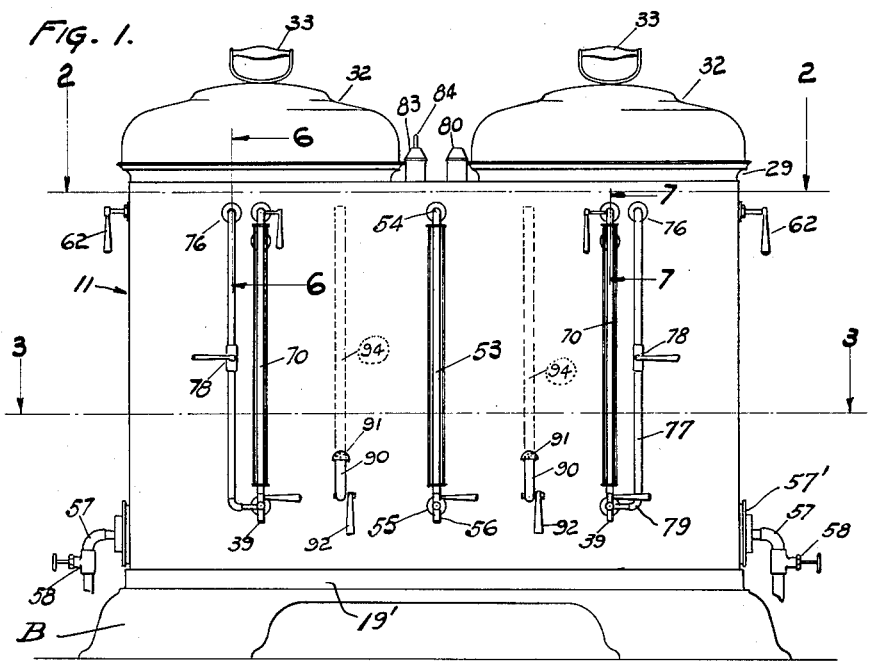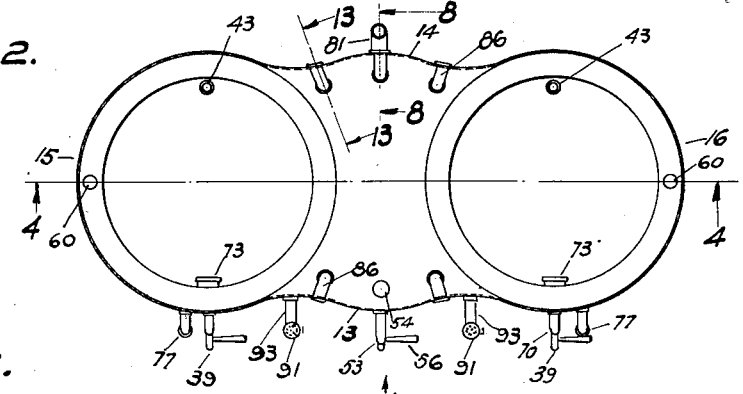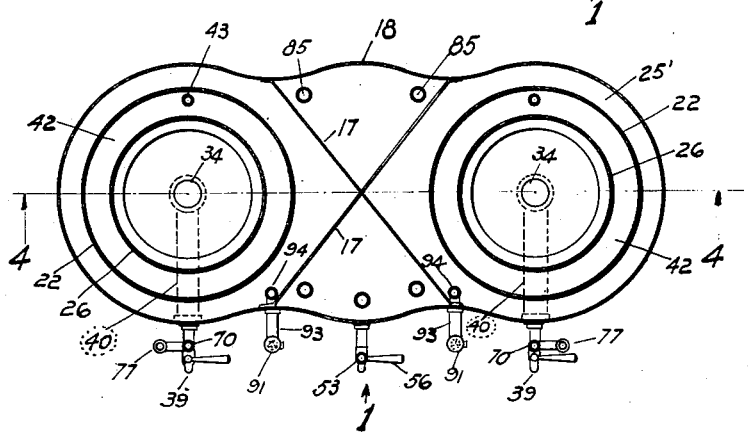

March 17, 1931.  W. A. GLASCOCK  1,796,518
TWIN AUTOMATIC REPOURING COFFEE MACHINE
Filed Feb. 15, 1928  3 Sheets-Sheet 3
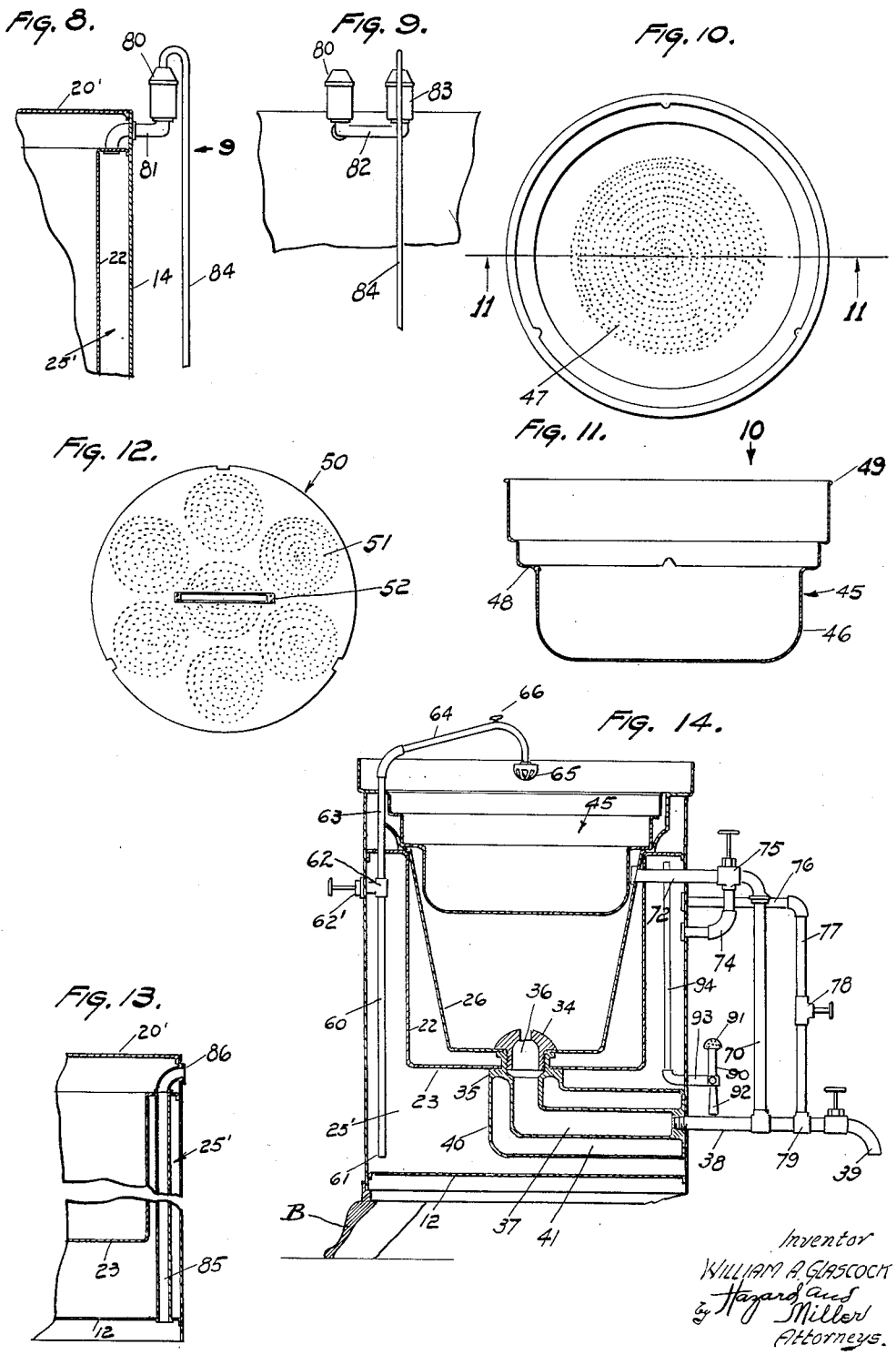

Patented Mar. 17, 1931

1,796,518

UNITED STATES PATENT OFFICE

WILLIAM ASA GLASCOCK, OF LOS ANGELES, CALIFORNIA

TWIN AUTOMATIC-REPOURING COFFEE MACHINE

Application filed February 15, 1928. Serial No. 254,463.

My invention is a twin automatic repouring coffee machine suitable for restaurant or hotel purposes.

An object of my invention is an appliance for making coffee, in which the coffee may be repoured and stirred by utilizing the steam generated in heating the water from which the coffee is made, such water also being used to keep the coffee at the desired temperature.

Another feature of my invention is the construction of a compact arrangement preferably having glass tubes through which the prepared coffee is visible, and with connections to the steam chamber of the water tank, whereby steam may be circulated downwardly to force such steam up through the bottom of the crock and thus stir the prepared coffee; or if desired the steam may be blown upwardly through the glass tube and thus by an injector action convey the prepared coffee to the top of the crock for repouring.

Another feature of my invention is the construction of the coffee appliance in a double form, that is, with two coffee containing crocks mounted in a suitable tank or container and with a heat insulating air space between each of the crocks and the hot water in the tank and also having an air space surrounding the outlet pipe from each of the crocks.

Another feature of my invention is the construction of the crocks with a collar or finishing piece formed integral therewith to thereby prevent the prepared coffee from overflowing the crock and flowing down in the interior of the coffee making appliance.

Other features of my invention will be apparent from the following description and claims. My invention is illustrated in the accompanying drawings, in which:

Figure 1 is a front elevation in the direction of the arrows 1 of Figs. 2 or 3.
Fig. 2 is a horizontal section on the line 2—2 of Fig. 1 in the direction of the arrows.

Fig. 3 is a horizontal section on the line 3—3 of Fig. 1 in the direction of the arrows.

Fig. 4 is a longitudinal section on the lines 4—4 of Figs. 2 or 3.

Fig. 5 is a transverse vertical section on the line 5—5 of Fig. 4 in the direction of the arrows.

Fig. 6 is a detail vertical section on the line 6—6 of Fig. 1 in the direction of the arrows, through the steam outlet.

Fig. 7 is a detail vertical section on the line 7—7 of Fig. 1 in the direction of the arrows, showing the repouring arrangement for coffee.

Fig. 8 is a vertical detail section on the line 8—8 of Fig. 2 in the direction of the arrows, showing the steam blow-off.

Fig. 9 is an elevation of the steam blow-off, the direction of view being indicated by the arrow 9 of Fig. 8.

Fig. 10 is a plan of the receptacle for ground coffee taken in the direction of the arrow 10 of Fig. 11.

Fig. 11 is a vertical section of the ground coffee receptacle taken on the line 11—11 of Fig. 10.

Fig. 12 is a plan of the cover of the ground coffee receptacle.

Fig. 13 is a detail vertical section on the line 13—13 of Fig. 2 in the direction of the arrows.

Fig. 14 is a diagrammatic cross-section showing the piping for stirring and repouring the coffee, the proportions being distorted to show the details more clearly.

In constructing my invention I employ a relatively large tank 11, this having a bottom 12, with front and back walls 13 and 14 and rounded ends 15 and 16. The ends are preferably formed cylindrical in part and merge into the side walls, there being cross braces 17, forming stays for the opposite side walls. These side walls have an outward bulge 18 at the center. The side and end walls have a depending flange 19 extending downwardly below the bottom 12 and the flange 19 rests within an upstanding shoulder 19′ extending around the upper edge of a base B upon which the tank 11 is removably supported. The top of the tank is open as illustrated by the top edge 20, except at its central portion, where a closure 20′, extends thereacross.

Constructed internally of the tank there are a pair of metal containers 21, each of which is formed with cylindrical walls 22 with a flat base 23, there being an outwardly extending flange 24 which engages the side walls of the tank and at the center portion this flange forms a top structure 25 joining the top of the two containers. A water chamber 25' is formed by the space between the tank and the outside of the containers, the water in this space being heated by preferably a single gas burner located under the bottom 12 inside the base B.

Inside of each of the containers 21 there is a crock 26, each being illustrated as having a wide open top 27 and a closed base 28, with a molded collar or finishing piece 29 secured integrally to the top of the main portion of the crock. This collar has an annular flange 30 resting on the flange 24 of the container 21 of the top piece 25, thus supporting the base of the crock above the bottom 23 of the container. The upper molded portion 31 of the collar or finishing piece extends above the top edge 20 of the tank. A cover 32 which is of a more or less ornamental nature and is provided with a handle 33, fits in the top of the collar or finishing piece, forming a closure when making the coffee and when repouring, stirring, serving, etc.

The bottom of each crock is provided with a discharge plug 34 illustrated as being threaded into the bottom and threaded into a casting 35 on the bottom 23 of the container, this discharge plug having a discharge opening 36. A coffee discharge pipe 37 connects with the casting 35 and leads outwardly through a suitable connection 38 on the tank, leading to a spigot 39. Surrounding the pipe 37 there is an outer pipe 40 which leaves an annular air space 41, this functioning as a heat insulating space. There is also an enlarged air space 42 between the crock and the walls and the bottom of the tank 11, this also functioning as a heat insulator, preventing the liquid coffee in the crock from being in direct contact with the hot water in the water chamber 25'. There is a drain pipe 43 leading from the bottom 23 of each container 21 through the bottom 12 of the tank, these being for the purpose of draining any moisture which may get into the air space 42.

A ground coffee holder 45 is provided, this being illustrated in detail in Figs. 10, 11 and 12. The container has a basket structure 46 with perforations 47 at the bottom and an annular shoulder 48 which rests on the flange 30 of the collar 29. The top edge 49 is designed to extend above the edge 20 of the tank above the upper edge 31 of the combined crock and collar. A cover 50 is formed to rest on the flange 48 at the top of the basket 46. This cover has perforations 51 and is provided with a handle 52.

An inspection glass tube 53 is connected to pipes 54 and 55 connected respectively to the water tank above and below the water level, that is, the pipe 54 is connected into the steam space and the pipe 55 into the water space, to enable a person to determine the height of water in the tank. The pipe 55 is provided with a valve 56 to allow drawing off hot water when desired.

The tank is filled by water pipe connections 57 preferably at each end of the tank, each pipe 57 having a valve 58 which allows filling of the water chamber 25' with fresh water from either end. Each of the connections 57 is in communication with the water chamber 25' through a man-hole cover plate 57' which is threadedly secured in position to close a relatively large opening through which access to the interior of the tank 11 may be had after plate 57' has been removed to effect minor repairs or for cleansing the interior of the tank. By so connecting the water inlet pipe 57, the necessity of connecting the inlet through the bottom 12 is obviated, with the result that the inlet will not be as liable to become clogged by sediment and deposited alkali. Furthermore, this construction results in positioning the valves 58 out from under the tank 11 and thus makes them more readily accessible. A pipe 59 connected to the bottom 12 of the tank, serves as a drain for the chamber 25', this being controlled by a valve not illustrated.

The arrangement for making the coffee comprises a hot water pipe 60 at each end of the tank, the lower end 61 being positioned adjacent the bottom 12 of the tank. Each of these pipes is controlled by a valve 62, the handle 62' of which is accessible from the exterior of the tank 11, and each pipe 60 has a swivel 63 on the top. To this swivel there is connected a discharge pipe 54 having a spray nozzle 65, there being a small handle 66 to facilitate swinging the pipe.

The procedure of making the coffee is by placing the ground coffee in the coffee holder 45 and placing one of these holders 45 thus supplied with ground coffee, in either one or each of the crocks, as illustrated in Fig. 4. With the covers 50 in place, the valves 62 may then be opened, which allows hot water to flow upwardly in the pipes 60 and be discharged through the spray nozzles 65. The hot water is forced upwardly by a slight steam pressure of approximately one to two pounds per square inch. This scalding water is distributed by passing through the perforations in the covers and through the coffee in the baskets 46, allowing the drip to fall into the crocks in the usual manner. When sufficient coffee has been made of the desired strength, the coffee holders 45 are removed. During this action it is preferable to have the covers 32 in place.

Each of the coffee crocks is provided with a glass inspection tube 70. The lower end of each tube is connected by a coupling 71 to the coffee discharge pipe 37, and at its upper end is connected to a pipe 72, which leads into the upper part of the crock, as indicated at 73, this preferably being above the level of the coffee in the crock.

There is a steam pipe 74 leading from the steam space in the water chamber 25', such pipe connecting to the pipe 72, there being a two-way valve 75 at the junction of the pipes 74 and 72, the latter connecting to the gauge glass 70.

After the coffee has been made, if it is desired to stir the coffee liquid, the valve 75 may be manipulated so that steam is forced outwardly through the steam pipe 74, through the valve 75, downwardly through the glass gauge pipe 70 and through the pipe 37 into the bottom of the crock, through the discharge opening 36, in which case a certain amount of the steam is condensed in the coffee liquid, but this gives a stirring action from the bottom.

The mechanism for repouring the coffee comprises a pipe 76 connected to the steam portion of the water chamber 25', this preferably being attached to an outside wall, and leads downwardly through a repouring pipe 77 having a valve 78, such pipe being connected by a coupling 79 to the coffee discharge pipe 37 leading to the spigot 39.

When it is desired to repour the coffee, the coffee holder being removed, the valve 78 is opened so that steam is emitted through the pipe 76, flows downwardly through the pipe 77, and the connection 79 on the pipe 37, and through a suitable injector nozzle (not shown) upwards through the glass 70 carrying with it liquid coffee drawn from the bottom of the crock through the pipe 37. The steam thus carries the coffee upwardly through the glass gauge pipe 70 and through the valve 75, which has been turned in the proper direction to shut off the steam pipe 74. The liquid coffee is then discharged through the pipe 72 into the upper part of the crock. This gives a repouring or circulation of the liquid coffee and may be continued for the desired length of time, the liquid coffee condensing some of the steam and becoming heated in the procedure.

To prevent damage to the tank from excessive pressure of the steam, I provide a steam blow-off valve 80 connected by a pipe 81 to the steam part of the water chamber 25', the connection illustrated being through the flange 24 of the container 21, this being set to discharge at usually one to two pounds of pressure. Connected to the blow-off valve there is a pipe 82 leading to a drip collector 83, which drip collector discharges the entrained moisture through a pipe 84 into a pan or the like on which the coffee appliance stands.

There are a series of flues 85 which extend upwardly through the tank, passing through the bottom 12, and the top structure 25, and preferably having an outwardly turned bend 86 directed through the walls 13 and 14. These provide for passage of the products of combustion and heated air from the gas burners. These in passing through the water chamber 25' function additionally to heat the water.

From the above description it will be seen that I have invented a simple type of coffee making appliance which has the characteristics of the air space around the crock and around the tube for running off the coffee. In addition to this the crock and the collar or finishing piece are formed integral, thereby preventing the danger of overflowing of the liquid coffee into the main body of the tank or the air space. The appliance provides a simple way of pouring the scalding water over the ground coffee in the container therefor, and swivelling the pouring pipe to one side. In addition, I have a simple arrangement by which the steam generated from the hot water may be utilized to stir the liquid coffee by blowing steam into the base of the crock; or by an alternative procedure the liquid coffee may be repoured by using the steam and passing this upwardly through the gauge glasses and into the top of the crock.

In order to sterilize or steam coffee pots or cups I provide a pair of steam jet cocks 90 having spray nozzles 91 and operating handles 92. Horizontal pipes 93 extend from the jet cocks into the water compartment of the tank and vertical pipes 94 lead upwardly to the top of the steam chamber, this giving a flow of steam when desired for sterilizing or warming coffee pots or cups.

Various changes may be made in the principles of my invention without departing from the spirit thereof, as set forth in the description, drawings and claims.

I claim:

1. A coffee making appliance comprising in combination a tank, a container mounted therein and having an outwardly extending flange at the top, said flange engaging the tank, there being a water and steam space between the container and the tank, a crock having an integral collar or finishing piece mounted in the container with the collar resting on the said flange, said collar being extended to provide an annular exposed extension of said tank and having a rim thereon, a cover seated on said collar inside said rim, and means to draw off coffee from the crock.

2. A coffee making appliance comprising in combination a tank having partly cylindrical end walls with a pair of cylindrical crocks mounted concentrically with said end walls, front and back walls connecting the cylindrical part of the end walls and having an outward bulge extending vertically, diagonal braces between the front and back walls, and means to draw coffee from the crocks.

3. A coffee making appliance comprising in combination a tank, a container therein having a horizontal flange on the upper ends of the side walls connected to the tank forming a steam and water space between the container and the tank, a crock having an integrally formed collar or finishing piece, the said finishing piece having a horizontal flange resting on the flange of the container, a ground coffee holder having perforations in the bottom, and an annular shoulder resting on the flange of the collar.

4. A beverage urn comprising a tank, and means for supplying said tank with water, comprising a cover plate threaded to a wall of the tank, and a conduit in communication with the interior of the tank through said cover plate.

5. A beverage urn comprising a tank having a man-hole in a side wall thereof, a cover plate for said man-hole threadedly securable therein, and a filling conduit affixed to said cover plate and in communication with the interior of the tank through said cover plate.

In testimony whereof I have signed my name to this specification.

WILLIAM ASA GLASCOCK.